United States Patent [19]

Hirose et al.

[11] 3,876,407

[45] Apr. 8, 1975

[54] METHOD FOR PRODUCING A METAL COATED GLASS-CERAMIC ARTICLE

[75] Inventors: Kenzi Hirose; Yasuhiko Inamori; Yoshikatu Higuchi, all of Nagoya, Japan

[73] Assignee: Ishizuka Garasu Kabushiki Kaisha, Nagoya-shi, Aichi-ken, Japan

[22] Filed: Aug. 8, 1973

[21] Appl. No.: 386,623

[30] Foreign Application Priority Data
Dec. 25, 1972 Japan.................................. 48/1427

[52] U.S. Cl. ............................. 65/30; 65/32; 65/33; 65/60
[51] Int. Cl..... C03c 3/22; C03b 29/00; C03c 17/00
[58] Field of Search ...................... 65/33, 60, 30, 32

[56] References Cited
UNITED STATES PATENTS

| 3,266,912 | 8/1966 | Murphy .............................. 65/33 X |
| 3,420,645 | 1/1969 | Hair .................................. 65/33 X |
| 3,429,742 | 2/1969 | Grego et al. ........................ 65/60 X |
| 3,460,927 | 8/1969 | Fischer et al. ..................... 65/33 X |
| 3,464,806 | 9/1969 | Seki et al. ......................... 65/33 X |
| 3,468,745 | 9/1969 | Navez et al. ....................... 65/60 X |
| 3,479,217 | 11/1969 | Spanovdis........................... 65/60 X |
| 3,490,887 | 1/1970 | Herczug et al......................... 65/32 |
| 3,704,110 | 11/1972 | Finn.................................. 65/33 |
| 3,775,154 | 11/1973 | Grego et al. ........................ 65/60 X |
| 3,790,360 | 2/1974 | Kato et al. ......................... 65/32 X |
| 3,802,892 | 4/1974 | Pikooz.............................. 65/32 X |

*Primary Examiner*—S. Leon Bashore
*Assistant Examiner*—Frank W. Miga
*Attorney, Agent, or Firm*—Sherman & Shalloway

[57] ABSTRACT

A method for producing a metal-coated glass-ceramic article which comprises melting a glass of a composition in the silica-alumina system containing a nucleating agent and a small amount of copper and/or silver compounds, forming the composition into a glass article, applying a covering substance containing copper and/or silver or compounds of these to the glass article, and heat-treating the covered glass article in a reducing atmosphere to devitrify the glass into a glass-ceramic article and at the same time form a metallic layer of increased thickness on the surface of the article. The composition of the covering substance may further contain other metal components besides copper and/or silver. When a manganese component is included as the other metal component, the adhesion of the metallic layer to the glass-ceramic article is especially increased.

5 Claims, No Drawings

METHOD FOR PRODUCING A METAL COATED GLASS-CERAMIC ARTICLE

This invention relates to a glass-ceramic article having a metal coating layer of increased thickness, and to a method of making the article.

Previously, the vacuum evaporation method, the electroless plating method, and the Telefunken method have been known for forming metallic coatings on the surface of glass-ceramic articles. All of these methods involve extremely complicated operations. The metal coating layers formed by the first two methods are very thin, and have reduced adhesion to a glass-ceramic body. The third method involves baking molybdenum-manganese on the substrate, forming a coating layer of a relatively large thickness. However, the steps involved are especially complicated, and a hard solder cannot be directly applied to the formed coating layer. Another method was proposed by the same assignee as in the present application in U.S. Pat. No. 3,464,806 (corresponding to German Pat. No. 1,496,540, and French Pat. No. 1,383,611), which is a method for producing a metal coated glass-ceramic article by melting a glass-forming batch containing a nucleating agent and 0.05 to 5 percent by weight, calculated as the metal based on the total weight of the glass-forming composition, of at least one compound of a metal selected from copper compounds and silver compounds, forming the melt into a glass article of desired configuration, and heating the formed glass article in a reducing atmosphere to devitrify the glass, while causing the metallic ions generated from said metal compound to migrate through the glass matrix and diffuse to the surface of said devitrified article and to reduce the metallic ions to the state of metallic particles on the surface by said reducing atmosphere. This method can be performed by an easy operation, and the resulting metal coated layer adheres integrally to the glass-ceramic body, and its bond strength is high. However, the thickness of the resulting metal coated layer is usually as thin as 5 to 6 microns, and at most about 10 microns, and therefore, it is impossible to apply a solder directly thereto.

The present invention relates to an improvement of the last-mentioned method. According to the present invention, a method of forming a metallic coating layer having an increased thickness, say up to 200 microns, on the surface of a glassceramic article using an easy operation, and the resulting metal-coated glass-ceramic article are provided. In the product of this invention, the metal coated layer is firmly adhered to the surface of the glass-ceramic article, and does not come apart from it at a temperature as high as 800°C. or more. The metal coated layer exhibits resistance to vibration and impact strength. Accordingly, the product of this invention is useful in various applications requiring such properties, such as component parts of after-burners for automobile exhaust gases. Furthermore, since the metal coated layer is thick, not only a soft solder but also a hard solder can be directly applied thereto. Thus, the product of this invention can be used for electric component parts such as a vacuum switch or a vacuum relay.

The method of this invention is a method for producing a metal coated glass-ceramic article by melting a glass-forming composition containing silica and alumina as the main components with a nucleating agent, and 0.05 to 5 percent by weight, (calculated as the metal based on the total weight of the glass-forming composition), of at least one metal compound selected from copper compounds and silver compounds. The method comprises forming the melt into a glass article of the desired configuration, and heating the resulting glass article in a reducing atmosphere to devitrify the glass, while causing the metallic ions generated from said metal compound by said reducing atmosphere to migrate through the glass matrix and diffuse to the surface of said devitrified glass article and to reduce the metallic ions to the state of metallic particles on the surface. Prior to the heating step in a reducing atmosphere, the surface of the resulting glass article is covered with a substance consisting essentially of (a) at least 5 % of at least one member selected from copper, silver and compounds of these metals, and (b) 0 to 95 % of at least one member selected from metals other than copper and silver, and compounds of such metals, which metal or metal compound has a melting point higher than the temperature of the heating step. These percentages are calculated as the metal based on the total weight of the covering substance calculated as the total metal.

During the heating step, the metal ions diffused in the glass-forming composition, that migrate to the surface, combine with the metal ions in the covering substance, thus forming a metallic layer of increased thickness which is integrally incorporated with the surface of the glassceramic article.

Preferred embodiments of this invention will be further described below.

The composition of the starting glass batch composition contains silica and alumina as main components. Examples of the composition include silica-alumina-lithia, silica-alumina-lithia-magnesia, silica-alumina-lithia-zinc oxide, silica-alumina-magnesia, silica-alumina-calcium oxide, and silica-lithia systems. The glass composition of this type may include other components, such as boron oxide, sodium oxide, potassium oxide, or lead oxide.

The preferred nucleating agents include titania, zirconia, fluorine, phosphorous pentoxide, titania-zirconia, titania-zirconia-fluorine, zirconia-fluorine, titania-fluorine, phosphorous pentoxide-fluorine, titania-phosphorous pentoxide, zirconia-phosphorous pentoxide, titania-phosphorous pentoxide-fluorine, zirconia-phosphorous pentoxide-fluorine, titania-zirconia-phosphorous pentoxide, and titania-zirconia-phosphorous pentoxide-fluorine. The nucleating agent may contain other components such as calcium fluorine, tin oxide, beryllium oxide, chromium oxide, vanadium oxide, nickel oxide, arsenic oxide, and molybdenum oxide.

The copper compounds and/or silver compounds to be included in the starting glass batch in the amount described above are oxides or compounds convertible to oxides at high temperatures, such as halides, sulfites, sulfates, nitrates, phosphates, or hydroxides.

The glass-forming composition containing the above nucleating agent and a compound of copper and/or silver is first melted in accordance with conventional glass making technique and then formed into a glass article of the desired configuration.

Then, a covering substance consisting of a metal or a metal compound is applied to the surface of the glass article formed. The covering substance contains at least 5 % of copper, silver and/or a compound thereof, and 0 to 95 % of at least one metal other than silver and copper or compounds of such metals, the percentages being calculated as metal by weight. It is essential that the copper and/or silver should be present in an amount of at least 5 %. If the amount is less than 5 %, the metal layer formed becomes less liable to bond to the metallic layer of the glass article formed. The copper and/or silver may be in the form of metal or in the form of a metal compound reducible to a metal in a reducing atmosphere at elevated temperatures. Specific examples of the metal or metal compounds are Cu, CuO, $Cu_2O$, $CuSO_4$, $CuCl_2$, $Cu(NO_3)_2$, Ag, $Ag_2O$, AgCl, $AgNO_3$, and $Ag_2SO_4$.

The metal other than copper and silver or their compounds may be included optionally in the covering substance in an amount of 95 % at most, in order to modify the electrical, chemical, physical, and other properties of the metal layer formed finally. Where two or more metals are present in the covering substance, they may be in the form of an alloy. The covering substance containing this optional component must have a higher melting point than the temperature employed in the subsequent heating step, because if the melting point is lower, coagulation occurs, and a homogeneous coating is not produced.

Examples of the metal or its compound include silicon, titanium, vanadium, chromium, manganese, iron, cobalt, nickel, zinc, germanium, aluminum, zirconium, niobium, molybdenum, palladium, cadmium, indium, tin, calcium, barium, tantalum, tungsten, lead and bismuth; and oxides, hydroxides, halogenides and salts of these metals. Metals having a low melting point, such as zinc, aluminum, cadmium, tin, lead, or indium should be used in the form of an alloy or a compound which does not melt at the temperature of the heating step.

Several examples will be given showing the influence of the above-described metals other than copper and silver on the properties of the metallic layer finally formed. For example, palladium, niobium, indium and tatalum increase the electric conductivity of the metallic layer; aluminum, calcium and magnesium increase the electric resistance of the metallic layer; and titanium, molybdenum and manganese increase the bond strength of the metallic layer to the glass-ceramic body.

It has been found that manganese especially has an effect of remarkably increasing the bond strength of the metallic layer to the glass-ceramic body. The bond strength of the metallic layer having no manganese content is usually 0.7 to 1.4 $Kg/mm^2$, whereas the metal layer containing manganese has a bond strength of about 2 to 5 $Kg/mm^2$. Accordingly, such a metalcoated glass-ceramic is especially useful for applications which require high bond strength. The increased bond strength of the metallic layer as a result of the presence of manganese is ascribable to the fact that manganese penetrates into the glass body in the subsequent heat-treatment step and is combined with alumina or silica or both present in the glass matrix to form a compound such as $MnO \cdot Al_2O_3$ or $MnO \cdot Al_2O_3 \cdot nSiO_2$ and that the metallic layer is integrally bonded to the glass-ceramic body through an interlayer containing such a dispersed compound. This interlayer also contains dispersed therein copper and/or silver or their oxides which are produced as a result of the copper and/or silver compound contained in the composition of the starting glass batch diffusing to the surface of the glass article in the heat-treatment step. The above ingredients present in the interlayer form a solid solution. The presence of this interlayer can be confirmed by an electromicro probe X-ray analyzer, scanning electron microscope or X-ray analyzer.

The amount of the manganese component to be present in the covering substance is desirably 0.1 to 80 % by weight, more preferably 5 to 60 % by weight, calculated as the metal based on the total weight of the covering substance. If it is smaller than 0.1 %, sufficiently high bond strength cannot be obtained. If it exceeds 80 % by weight, a solder tends to be difficult to apply to the metallic layer formed. The amount of the other optional metallic components may be 0 to 94.5 % by weight according to the amount of manganese and the amount of copper and/or silver. The form of manganese in the covering substance may be a metal, oxides, halides, and salts. The oxides are especially preferred.

Thus, a method for forming on a glass-ceramic article a metallic layer containing at least 5 % of copper and/or silver components and 0.1 to 80 % of manganese component, and the product obtained thereby is one of the especially characteristic and preferred embodiments of the present invention from the viewpoint of adhesion of the metallic layer to the glass-ceramic body.

The covering substance can be applied by any desired procedure to the surface of a glass article formed by melting the starting glass batch. Conveniently, a solution, suspension or slurry of the finely powdered covering substance in a liquid medium is prepared, and the glass article formed is dipped in it to adhere the above covering substance thereto. Alternatively, such a solution, suspension or slurry is coated, sprayed or partly printed on the surface of the article. Suitable liquid media may be those which decompose or evaporate in the subsequent heat-treatment and do not remain, such as water or organic solvents, e.g. alcohols, acetone, benzene, or butyl acetate. If desired, a temporary binder such as an organic adhesive, starch, rosin or nitrocellulose may be added to the medium. The amount of the covering substance to be applied depends upon the desired thickness of the metallic layer to be formed. However, it is desirable that the thickness of the metal layer should be up to 200 microns, preferably up to 100 microns. Attempts to increase its thickness excessively will result in failure of the reducing atmosphere to diffuse to the surface of the glass body in the subsequent heat-treatment step, and make it impossible to obtain a metallic layer firmly bonded to the glass-ceramic body.

The glass article covered with the covering substance is then heat-treated in a reducing atmosphere. In this heat-treatment, the glass body is devitrified by the action of the nucleating agent contained in it and converted to a glassceramic. At the same time, metallic ions generated from the copper and/or silver components contained in the glass migrate towards the surface of the glass body and are reduced to their metallic state on the surface of the glass article by the action of the surrounding reducing atmosphere so as to produce a thin metallic layer. In an area beneath this surface, the metallic ions are dispersed in the glass matrix in the form of a metal and oxide and form as an interlayer. At this time, the covering substance applied to the surface of the glass article is reduced to the metallic state by the reducing atmosphere if it is a metallic compound, and is sintered or alloyed by the treating heat. It is then integrated with the thin layer of copper and/or silver which has been formed as a result of migration from the interior of the glass body to form a metallic layer of increased thickness. Where the covering substance contains a manganese component, manganese penetrates into the interior of the glass body to form an interlayer in which it is bonded with alumina and/or silica. The metallic layer of increased thickness adheres more firmly to the glass-ceramic body when it contains the manganese component.

The heat-treatment in a reducing atmosphere can be carried out under the same conditions as the method disclosed in U.S. Pat. No. 3,464,806. Briefly, this method involves heating the glass article coated with the covering composition gradually to the glass transition temperature of the glass in a reducing atmosphere, preferably at a rate not in excess of 300°C. per hour, and maintaining it at a temperature between the glass transition temperature and the melting point of copper and/or silver for a period of from about 15 minutes to about 5 hours.

The reducing atmosphere can be made of hydrogen, carbon monoxide, a combustible gas such as methane, ethane, propane or butane, or city gas.

After this heat-treatment, the product is gradually cooled to room temperature in a reducing atmosphere, and then taken out. A plated layer can of course be applied to the metal layer of the product formed.

The products of this invention are useful as materials or component parts of electric or electronic machinery such as print wired base plates, condensers, communicating machines, or computers. Since this product has a metallic layer of increased thickness, it is possible to apply a soft or hard solder directly to the metallic layer thereof. Furthermore, since the metallic layer containing manganese is very firmly bonded to the glass-ceramic body, it is very useful as an electrical component part such as a vacuum switch or vacuum relay, or an after-burner component part for automobile exhaust gases. The product can also be used as a material for various decorative articles and consumer goods because of its beautiful appearance.

The following Examples illustrate the present invention.

EXAMPLE 1

Each of the glass batches of the compositions shown in Table 1 was melted in an electric furnace for 3 to 6 hours at about 1430° to 1500°C. to form a thin plate having a thickness of 2 mm and a length and a width both of 10 mm. The covering substances Nos. 1 to 11 in Table 2 were uniformly coated on the resulting samples Nos. 1 to 11 respectively. Each of the coated samples was placed in an electric furnace, and heated in a reducing atmosphere of hydrogen at a rate of about 120°C. per hour and heat-treated for about 30 minutes at a temperature of 680° to 750°C. Then, the temperature was raised to about 900° to 1000°C. at a rate of 100°C. per hour, and the sample was maintained at this temperature for about 1 hour. The results obtained are shown in Table 3. Sample No. 12 is an article for comparison which was not coated with the covering substance. In these Examples, there is a tendency that the bond strength increases with smaller particle diameter of the covering substance.

Table 1

| Components | Glass composition (% by weight) Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 62.5 | 63.1 | 55.4 | 61.8 | 58.7 | 43.8 | 59.5 | 59.5 | 61.6 | 65.9 | 59.5 | 59.5 |
| $Al_2O_3$ | 19.2 | 20.5 | 16.8 | 21.3 | 26.4 | 17.6 | 15.8 | 15.8 | 20.0 | 20.9 | 15.8 | 15.8 |
| $Li_2O$ | 6.1 | 5.7 | 2.1 | — | 4.4 | 0.3 | 5.0 | 5.0 | 3.1 | 5.2 | 5.0 | 5.0 |
| MgO | 2.8 | 0.5 | 8.1 | 9.0 | — | — | 6.0 | 6.0 | 7.3 | — | 6.0 | 5.0 |
| CaO | — | — | 4.8 | — | — | — | — | — | — | — | — | — |
| BaO | — | — | — | — | — | 25.0 | — | — | — | — | — | — |
| ZnO | — | — | — | — | — | — | — | — | — | — | — | — |
| $ZrO_2$ | 2.0 | — | 2.9 | 3.0 | 1.0 | — | 3.7 | 3.7 | — | — | 3.7 | 3.7 |
| F | 3.0 | 3.5 | 4.9 | — | 2.0 | — | 3.0 | 3.0 | 4.5 | — | 3.0 | 3.0 |
| $TiO_2$ | 2.4 | 5.7 | — | 3.4 | 2.0 | 12.0 | 2.0 | 2.0 | 1.5 | 6.5 | 2.0 | 2.0 |
| $P_2O_5$ | — | — | — | — | 3.5 | — | — | — | — | — | — | — |
| $B_2O_3$ | — | — | 0.9 | — | — | — | 4.0 | 4.0 | — | — | 4.0 | 4.0 |
| $Na_2O$ | — | — | 3.1 | — | 1.0 | — | — | — | — | — | — | — |
| $K_2O$ | — | — | — | — | — | — | — | — | — | — | — | — |
| CuO | 2.0 | 1.0 | 1.0 | 1.5 | 1.0 | 1.2 | 1.0 | 1.0 | — | — | 1.0 | 1.0 |
| AgO | — | — | — | — | — | — | — | — | 2.0 | 1.5 | — | — |

Table 2

| No. | 1 | 2 | 3 | 4 | 5 | 6 |
|---|---|---|---|---|---|---|
| Covering substance | CuO | CuO | $Cu_2O$ | $CuCl_2$ | $CuSO_4$ | $Cu_2O$ |
| Particle size ($\mu$) | 5–20 | 20–60 | 5–20 | — | — | 20–60 |
| Liquid medium | Water | Ethanol | Acetone | Water (saturated solution) | Water (saturated solution) | Benzene |

| No. | 7 | 8 | 9 | 10 | 11 | 12 |
|---|---|---|---|---|---|---|
| Covering substance | CuO | CuO | $Ag_2O$ | AgCl | $AgNO_3$ | — |
| Particle size ($\mu$) | 5–20 | 50–100 | 50–100 | 20–60 | — | — |
| Liquid medium | Methanol | Methanol | Propanol | Water | Water (saturated solution) | — |

Table 3

| No. | 1 | 2 | 3 | 4 | 5 | 6 | 7 | 8 | 9 | 10 | 11 | 12 |
|---|---|---|---|---|---|---|---|---|---|---|---|---|
| Thickness of metal coating ($\mu$) | 17 | 35 | 20 | 15 | 12 | 33 | 18 | 66 | 74 | 40 | 15 | 6 |
| Bond strength (Kg/mm$^2$) | 0.95 | 1.0 | 1.1 | 1.2 | 1.3 | 0.9 | 1.2 | 1.0 | 0.8 | 0.75 | 1.0 | 1.1 |

EXAMPLE 2

A plate having a thickness of 2 mm and a width and length both of 10 mm was formed in the same way as in Example 1 except that each of the glass compositions shown in Table 4 was used. The covering substances I to XII shown in Table 5 were applied respectively to the resulting samples Nos. 21 to 30. Each of the samples was then placed in an electric furnace and heated in a reducing atmosphere of hydrogen at a rate of about 120°C. per hour, and heat-treated for about 30 minutes at a temperature in the range of about 650 to 800°C. according to each sample. The temperature was then raised at a rate of about 100°C. per hour up to about 900° to 1100°C., and the sample was maintained at this temperature for about 1 hour, followed by gradual cooling to room temperature. The results obtained are shown in Table 6. It is seen from these runs that when the composition of the covering substance contains a manganese component, a metallic layer bonded very firmly to the glass-ceramic can be obtained.

Table 4

| Components | Glass composition (% by weight) Sample No. | | | | | | | | | |
|---|---|---|---|---|---|---|---|---|---|---|
| | 21 | 22 | 23 | 24 | 25 | 26 | 27 | 28 | 29 | 30 |
| SiO$_2$ | 62.5 | 63.1 | 55.4 | 61.8 | 58.7 | 43.8 | 59.5 | 59.5 | 61.6 | 65.9 |
| Al$_2$O$_3$ | 19.2 | 20.5 | 16.8 | 21.3 | 26.4 | 17.6 | 15.8 | 15.8 | 20.0 | 20.9 |
| Li$_2$O | 6.1 | 5.7 | 2.1 | — | 4.4 | 0.3 | 5.0 | 5.0 | 3.1 | 5.2 |
| MgO | 2.8 | 0.5 | 8.1 | 9.0 | — | — | 6.0 | 6.0 | 7.3 | — |
| CaO | — | — | 4.8 | — | — | — | — | — | — | — |
| BaO | — | — | — | — | — | 25.0 | — | — | — | — |
| ZnO | — | — | — | — | — | — | — | — | — | — |
| ZrO$_2$ | 2.0 | — | 2.9 | 3.0 | 1.0 | — | 3.7 | 3.7 | — | — |
| F | 3.0 | 3.5 | 4.9 | — | 2.0 | — | 3.0 | 3.0 | 4.5 | — |
| TiO$_2$ | 2.4 | 5.7 | — | 3.4 | 2.0 | 12.0 | 2.0 | 2.0 | 1.5 | 6.5 |
| P$_2$O$_3$ | — | — | — | — | 3.5 | — | — | — | — | — |
| B$_2$O$_3$ | — | — | 0.9 | — | — | — | 4.0 | 4.0 | — | — |
| Na$_2$O | — | — | 3.1 | — | 1.0 | — | — | — | — | — |
| K$_2$O | — | — | — | — | — | — | — | — | — | — |
| CuO | 2.0 | 1.0 | 1.0 | 1.5 | 1.0 | 1.2 | 1.0 | — | — | 1.5 |
| AgO | — | — | — | — | — | — | — | 1.0 | 2.0 | — |

Table 5

| | I | II | III | IV | V | VI |
|---|---|---|---|---|---|---|
| Covering substance | Cu$_2$O:MnO$_2$ | Cu:Mn | Cu$_2$O:Mn:Ni | Cu:Mn:Ni:Co | Cu$_2$O:Mn:Ti | Cu$_2$O:Mn:Mo |
| Weight ratio of constituents of the covering substance | 8 : 1 | 8 : 3 | 4 : 3 : 4 | 4 : 2 : 2 : 3 | 4 : 2 : 0.3 | 8 : 4 : 3 |
| Particle diameter ($\mu$) | 1–10 | 10–30 | 50–70 | 5–20 | 1–10 | 10–30 |
| Glass No. | 21 | 22 | 21 | 23 | 24 | 25 |
| Liquid medium | Methanol | Methanol | Methanol | Ethanol | Ethanol | Methanol |

| | VII | VIII | IX | X | XI | XII |
|---|---|---|---|---|---|---|
| Covering substance | Cu:Mn:Ni:Cr | Ag:Mn:O$_2$:Cu$_2$O | Ag:MnO$_2$ | Cu$_2$O:Mn:CaO | Cu:Mn:Fe | Cu$_2$O:Ni |
| Weight ratio of constituents of the covering substance | 4 : 2 : 4 : 3 | 4 : 1 : 1 | 3 : 1 | 8 : 3 : 3 | 8 : 4 : 3 | 7 : 4 |
| Particle diameter ($\mu$) | 5–20 | 10–30 | 10–30 | 5–20 | 1–10 | 50–70 |
| Glass No. | 26 | 28 | 29 | 27 | 30 | 21 |
| Liquid medium | Acetone | Acetone | Water | Ethanol | Methanol | Methanol |

Table 6

| | I | II | III | IV | V | VI | VII | VIII | IX | X | XI | XII |
|---|---|---|---|---|---|---|---|---|---|---|---|---|
| Thickness of metal coating ($\mu$) | 15 | 27 | 62 | 14 | 11 | 18 | 15 | 24 | 30 | 17 | 11 | 63 |
| Bond strength (Kg/mm$^2$) | 3.4 | 2.3 | 2.0 | 2.6 | 3.1 | 2.3 | 2.5 | 2.1 | 2.2 | 2.5 | 3.0 | 1.1 |

What we claim is:

1. In a method of producing a metal coated glass-ceramic article by:

melting a glass-forming batch containing silica and alumina as main components, a nucleating agent, and 0.05 to 5 percent by weight, calculated as the metal based on the total weight of the glass-forming composition, of at least one metal compound selected from copper and silver;

forming the melt into a glass article of the desired configuration;

and heating the formed glass article in a reducing atmosphere to devitrify the glass, while causing the metallic ions generated from said metal compound to migrate through the glass matrix, diffuse to the surface of said devitrified glass article and to reduce to the state of metallic particles at the surface, the improvement comprising:

A. covering the resulting glass article prior to the heating step in a reducing atmosphere, with a substance consisting essentially of
   a. at least one member selected from the group consisting of copper, silver, and compounds thereof, present in at least 5% metal weight based on the total metal weight of the covering substance, and
   b. at least one member selected from the group consisting of metals other than copper and silver, and compounds thereof, having a melting point higher than the temperature of the heating step, present in from 0 to 95% metal weight based on the total metal weight of the covering substance, and B. heating the covered glass article in a reducing atmosphere, whereby the metallic particles formed by metallic ion diffusion to the surface are combined with metallic particles of the covering substance, thereby forming a metallic layer of increased thickness which is integrally incorporated with the surface of the glass-ceramic article.

2. The method of claim 1 in which component (b) is manganese or a manganese compound and is present in from 0.1 to 80% metal weight.

3. The method of claim 2 in which component (b) is a manganese oxide and is present in from 5 to 60% metal weight.

4. The method of claim 1 in which component (b) is present in from 0.1 to 80% metal weight and contains manganese or a manganese compound plus at least one of the other metals or metal compounds.

5. The method of claim 1 in which component (b) is present in from 5 to 60% metal weight and contains manganese oxide plus at least one of the other metals or metal compounds.

* * * * *